United States Patent
Beizer et al.

(10) Patent No.: US 6,240,414 B1
(45) Date of Patent: May 29, 2001

(54) METHOD OF RESOLVING DATA CONFLICTS IN A SHARED DATA ENVIRONMENT

(75) Inventors: Mordechai M. Beizer, Scarsdale, NY (US); Daniel Berg, Wilton, CT (US); Rand Scullard, New York, NY (US); Pradeep R. Simha, St. James, NY (US); Mark A. Solomon, N. Massapequa, NY (US)

(73) Assignee: eiSolutions, Inc., Billerica, MA (US)

( * ) Notice: Subject to any disclaimer, the term of this patent is extended or adjusted under 35 U.S.C. 154(b) by 0 days.

(21) Appl. No.: 09/136,231

(22) Filed: Aug. 19, 1998

Related U.S. Application Data

(60) Provisional application No. 60/060,225, filed on Sep. 28, 1997.

(51) Int. Cl.[7] .................................................. G06F 17/30
(52) U.S. Cl. ....................................... 707/8; 707/1; 707/10
(58) Field of Search ....................... 707/1–10, 100–104, 707/200–206; 711/162, 144, 152; 712/16, 31; 713/202; 345/331, 333, 348; 701/202

(56) References Cited

U.S. PATENT DOCUMENTS

| | | | |
|---|---|---|---|
| 4,953,080 | 9/1998 | Dysart et al. ........................ 707/103 |
| 4,974,173 | 11/1990 | Stefik et al. .......................... 345/331 |
| 5,008,853 | 4/1991 | Bly et al. .............................. 345/331 |
| 5,065,347 | 11/1991 | Pajak et al. ........................... 345/348 |
| 5,107,433 | 4/1992 | Smith et al. .......................... 701/202 |
| 5,115,504 | 5/1992 | Belove et al. ........................ 707/100 |
| 5,220,657 | 6/1993 | Bly et al. .............................. 711/152 |
| 5,251,294 | 10/1993 | Abelow ................................ 707/512 |
| 5,276,835 | 1/1994 | Mohan et al. ........................ 711/144 |
| 5,280,609 | 1/1994 | MacPhail .............................. 707/1 |
| 5,339,389 | 8/1994 | Bates et al. ........................... 345/331 |
| 5,428,729 | 6/1995 | Chang et al. ......................... 345/331 |
| 5,504,889 | 4/1996 | Burgess ................................ 707/100 |
| 5,504,890 | 4/1996 | Sanford ................................ 707/3 |
| 5,506,983 | 4/1996 | Atkinson et al. .................... 707/1 |
| 5,530,880 | 6/1996 | Katsurabayashi .................... 713/201 |
| 5,544,360 | 8/1996 | Lewak et al. ........................ 707/1 |
| 5,551,046 | 8/1996 | Mohan et al. ........................ 707/8 |
| 5,559,692 | 9/1996 | Telingator et al. .................. 705/8 |
| 5,583,993 | 12/1996 | Foster et al. ......................... 709/205 |
| 5,590,356 | * 12/1996 | Gilbert ................................ 712/31 |
| 5,627,967 | * 5/1997 | Dauerer et al. ..................... 713/202 |
| 5,634,123 | 5/1997 | Bennion .............................. 707/100 |
| 5,659,734 | 8/1997 | Tsuruta et al. ...................... 707/8 |
| 5,671,407 | 9/1997 | Demers et al. ...................... 707/8 |
| 5,692,178 | 11/1997 | Shaughnessy ....................... 707/8 |
| 5,701,462 | 12/1997 | Whitney et al. .................... 707/10 |
| 5,706,452 | 1/1998 | Ivanov ................................ 345/331 |
| 5,752,068 | * 5/1998 | Gilbert ................................ 712/18 |
| 5,781,908 | * 7/1998 | Williams et al. ................... 707/104 |
| 5,809,543 | * 9/1998 | Byers et al. ......................... 711/162 |

\* cited by examiner

*Primary Examiner*—Ruay Lian Ho
(74) *Attorney, Agent, or Firm*—Hamilton, Brook, Smith & Reynolds, P.C.

(57) ABSTRACT

A method and system for automatically resolving data conflicts in a shared data environment where a plurality of users can concurrently access at least portions of a master data file is presented. Users process data files by means of local copies of a master data file. When an attempted update of a master data file with an edited data file from a user is detected, the updating file is analyzed to determine if any changes made are in conflict with changes made to the master data file by a second user. If a conflict is detected, it is resolved by merging the updating file into the master file according to a predefined set of rules. For conflicts which are not resolved by rule-based reconciliation, at least one user is notified of the conflict and presented with conflict resolving information and the conflict is resolved according to user input.

37 Claims, 11 Drawing Sheets

| CONTAINER FOR MANAGING ELECTRONIC DOCUMENTS – PATENT FILING |
|---|
| FILE EDIT VIEW CONTENT FIELD TOOLS HELP |

| NAME | STATUS | ASSIGNED TO | DEADLINE | COMMENT | LOCATION | TYPE |
|---|---|---|---|---|---|---|
| ☐ CLIENT CORRESPONDENCE | | | | | | |
| ☐ DRAFT APPLICATION | | | | ATTACHED | | MICROSOFT WORD D... |
| ☐ NEW MATTER FORMS | | | | ATTACHED | | MICROSOFT WORD D... |
| ☐ CONFLICTING VERSIONS OF THIS ITEM: | | | | | | |
| ☐ INVENTION DISCLOSURE STARTED | | | | | C:\DEMOS\WORKFOLDER \SO....... | |
| ☐ INVENTION DISCLOSURE NOT STARTED | | ☐ | | ☐ | C:\DEMOS\WORKFOLDER \SO....... | |
| ☐ PATENT OFFICE CORRESPONDENCE | | | | | | |
| ☐ FILED APPLICATION | | | | | http://www.uspto.gov | Internet Shortcut |
| ☐ ASSIGNMENT DOCUMENTS | | | | | | |
| ☐ OFFICE ACTIONS | | | | | | |
| ☐ AMENDMENTS | | | | | | |
| ☐ NOTICE OF ALLOWANCE | | | | | | |
| ☐ ISSUED PATENT | | | | | | |
| ☐ DRAWINGS | | | | | | |
| ☐ DRAWINGS AS FILED | | | | ATTACHED | | Bitmap Image |
| ☐ AMENDED DRAWINGS | | | | | | |
| ☐ FOREIGN FILINGS | | | | | | |

FOR HELP PRESS F1

*FIG. 6* ized Workfolder," filed on Sep. 28, 1997, the
METHOD OF RESOLVING DATA CONFLICTS IN A SHARED DATA ENVIRONMENT

CROSS REFERENCE TO RELATED APPLICATIONS

This application claims priority under 35 U.S.C. §119 from U.S. Provisional Application Ser. No. 60/060,225 entitled "Structured Workfolder," filed on Sep. 28, 1997, the contents of which is hereby incorporated by reference.

FIELD OF THE INVENTION

This invention relates to a method and system for resolving data conflicts in a shared data environment.

BACKGROUND OF THE INVENTION

In many business transactions, it is often necessary to assemble a complex set of documents in order to complete the transaction. Folders are a common way of organizing such documents. Some of the documents may be available from inception of the transaction, while others may be received or created as the transaction progresses. Certain documents may need to be available prior to commencing work on various transaction-related tasks. In addition, a number of people may need to work on the transaction simultaneously, all of whom need concurrent access to the transaction information.

Documents and data of this type may be stored in a shared, structured data object. These objects generally comprise various sections into which related documents are grouped, one or more forms into which data can be entered, links to other documents, etc. The data object is stored in a manner which allows it to be simultaneously accessed by many different users as needed. Accordingly, it is necessary to prevent conflicts from arising when two or more people simultaneously access and try to update the same data object.

A conventional solution is to "lock" a file or data object when it is opened and thereby prevent other users from modifying it. Although this scheme prevents conflicts between users, it also limits access by other users to a "read-only" mode until the first user is done and the file is unlocked. Some improvement is gained by a granular locking scheme where, for example, individual records in a database or data object are locked as they are opened, while the remaining database records remain unlocked. This scheme can be made arbitrarily more granular by extended the locking to a finer level such as individual fields within a record. A major drawback with locking schemes, at whatever level of granularity, is that they require users to decide a priori, either implicitly or explicitly, which data elements should be reserved for modification. They also are based on the assumption that users have access to a lock manager at the time that the decision is made to update a particular data element. Finally, granular locking schemes are subject to "deadly embrace" in which deadlock situations arise due to overlapping sets of locks. Locking mechanisms do not work well in a distributed processing environment with replicated data objects or in an environment where multiple off-line users need read/write access to the same data objects.

Several conventional products provide some support for distributed information systems with concurrent user access. These products include OPEN/workflow for Windows NT, published by Eastman Software, Microsoft Exchange, published by Microsoft Corporation, and Lotus Notes, published by Lotus Corporation. OPEN/workflow provides a distributed information store with replication on demand. A hierarchical lock manager is used to ensure that only one user can open a record for modification at any one time. A master lock manager keeps track of which information store has permission to lock an individual record. The master lock manager is responsible for transferring locking permission between information stores. The information stores each maintain their individual record. The master lock manager is responsible for transferring locking permission between information stores. The information stores each maintain their own individual lock manager to arbitrate access by individual users working with records from that information store. If a user cannot obtain an exclusive lock, then he or she is presented with a 'read-only' copy. Conflicts are prevented since only one user can modify a record at any one time.

Microsoft Exchange also provides a distributed information store with replication. Any number of users may open and modify the same record. However, only the first user to save a modified record can save it in the original record. Subsequent users who try to save their copy of the record are notified that the record has been changed. They are then given the option of either discarding their changes or saving their edited record as a separate file or record in the information store. The software does not attempt to automatically reconcile the changes to the record made by the users, nor does it assist a user in identifying which record elements have conflicting changes. Where two users are working with different information stores and each modifies their own copy of the record, Microsoft Exchange detects the situation during replication. The software then generates a conflict message that contains both versions of the record and sends a notification to the appropriate users. The software makes no attempt to automatically reconcile the contents of the conflicting records nor are the changes analyzed to assist the users in manual reconciliation.

Lotus Notes also supports information sharing in a distributed environment. Information is organized as "forms", where each form is made up of fields that may be of particular data types, such as text, number, time, and rich text. While both distributed and off-line access to shared data is supported via replication, the program does not automatically reconcile conflicting changes made to the same form by different users. Instead, Notes simply keeps both copies of the form and requires a user, such as the system administrator, to later decide which changes are to be kept and which are to be ignored. In a large system, this process creates a significant amount of work and also can reduce the confidence of users of a busy system that a given form is completely up to date.

Accordingly, it is an object of the invention to provide an improved data environment that allows multiple users to simultaneously access and edit the same shared data object without requiring an objects accessed by one user to be locked relative to later users.

It is a further object of the invention to provide a method and system to analyze changes made by several users to a data object and dynamically detect, mediate, and resolve potential data conflicts.

SUMMARY OF THE INVENTION

The above and other objects are accomplished by providing a system in which multiple users are permitted to access and update the same data object, hereafter referred to as a "Workfolder", without the use of a locking mechanism.

Instead of limiting user access to data to prevent possible conflicts, or merely recognizing that the record as a whole appears to be in conflict, as is done in the prior art, modifications to the same WorkFolder by different users are analyzed to determine whether a true conflict exists and to resolve the conflict. A true conflict exists only when two users modify the very same data value within the Work-Folder. If no true conflict exists, the modifications are merged. If the update is a true conflict, the program resolves the conflict with or without user intervention, depending on the environment in which the conflict is detected.

Attended conflict resolution is performed with a real-time mediation process during which one or more users are presented with information sufficient to resolve the conflict and provided with a series of conflict-resolving selections. Unattended conflict resolution is provided through a set of predefined rules. If the conflict is of a type which is not resolved by the rules, the conflicting data items are preserved as alternate sub-items within the single WorkFolder (i.e., a single data item such as an attached document, is replaced with the two conflicting data items with an additional tag indicating that the two are conflicting alternates). When the WorkFolder is later accessed, the sub-items are shown as being in conflict and the user is given the opportunity to correct the conflict. Through the use of unattended conflict resolution, the WorkFolder environment may be reliably implemented on a network system having a plurality of servers, each of which contains replicated or mirrored WorkFolder data that can be accessed by local users.

BRIEF DESCRIPTION OF THE DRAWINGS

The foregoing and other features of the present invention will be more readily apparent from the following detailed description and drawings of illustrative embodiments of the invention in which:

FIG. 6 is a program screen according to a preferred embodiment of the invention showing conflicting sub-items generated when a conflict requiring mediation occurs but mediation is not performed.

DETAILED DESCRIPTION OF THE INVENTION

Figure 1:
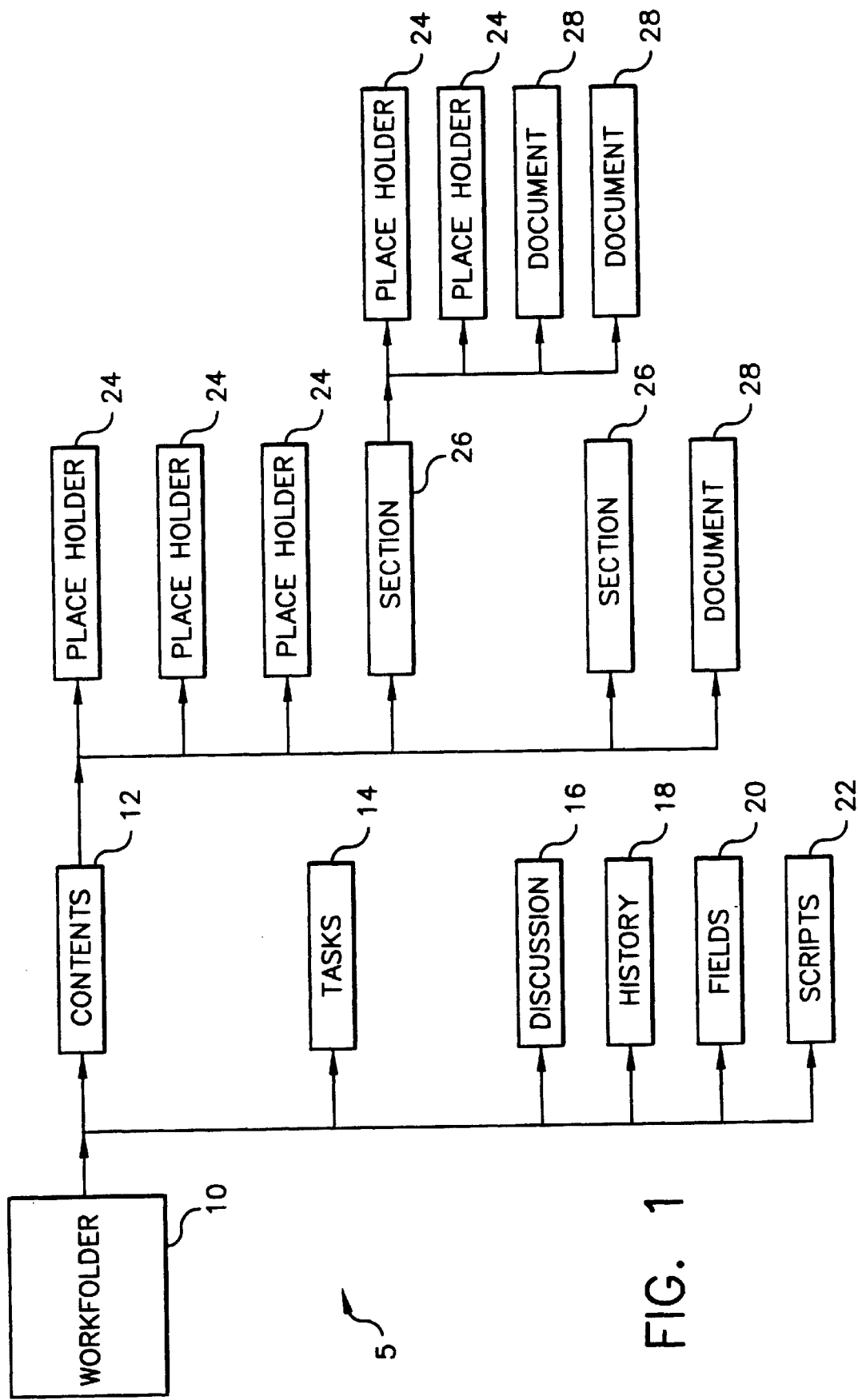
FIG. 1 is an illustrative diagram of the structural relationship of various data elements in a WorkFolder.

FIG. 1 is an illustration of a new form of a shared, structured data object 10 for organizing electronic documents, referred to herein as a "WorkFolder." The Work-Folder allows users to gather and organize a collection of documents and various supporting meta-data in a single data object that can be simultaneously accessed and updated by multiple users. A workfolder may contain sections 26 for grouping related documents 28, and according to a related aspect of the invention, placeholders 24 for indicating documents expected to be placed in the WorkFolder. The Work-Folder may also contain one or more task entries 14 used to track the progress of work related to a WorkFolder as well as supporting meta-data in the form of information fields 20, threaded discussions 16 and a detailed history log 18 of all changes made to the WorkFolder can be stored in the WorkFolder. The WorkFolder provides for process-related functionality by keeping track of tasks 14, including assignments and deadlines, by executing scripted macros 22 either on demand or in response to various events.

The WorkFolder is implemented as a specialized data object 10 that can be organized, configured, and accessed by the user with the aid of a program user interface as well as by third party applications through the use of an automation interface. The computing environment may be a single computer or many computers connected by one or more networks, including LAN's, intranets, and the Internet, where the computers are continuously or intermittently interconnected. Preferably, the WorkFolder program is implemented in a conventional operating system such as Microsoft Windows with a user interface based on conventional GUI elements and with an automation interface that is based on conventional standards such as OLE Automation or COM. The WorkFolder data object is stored persistently in such a manner that it can be stored, forwarded, and distributed across a network and be accessed and modified by software running on a variety of different platforms. A preferred persistent representation would be one conforming to widely accepted messaging standards.

Figure 2:
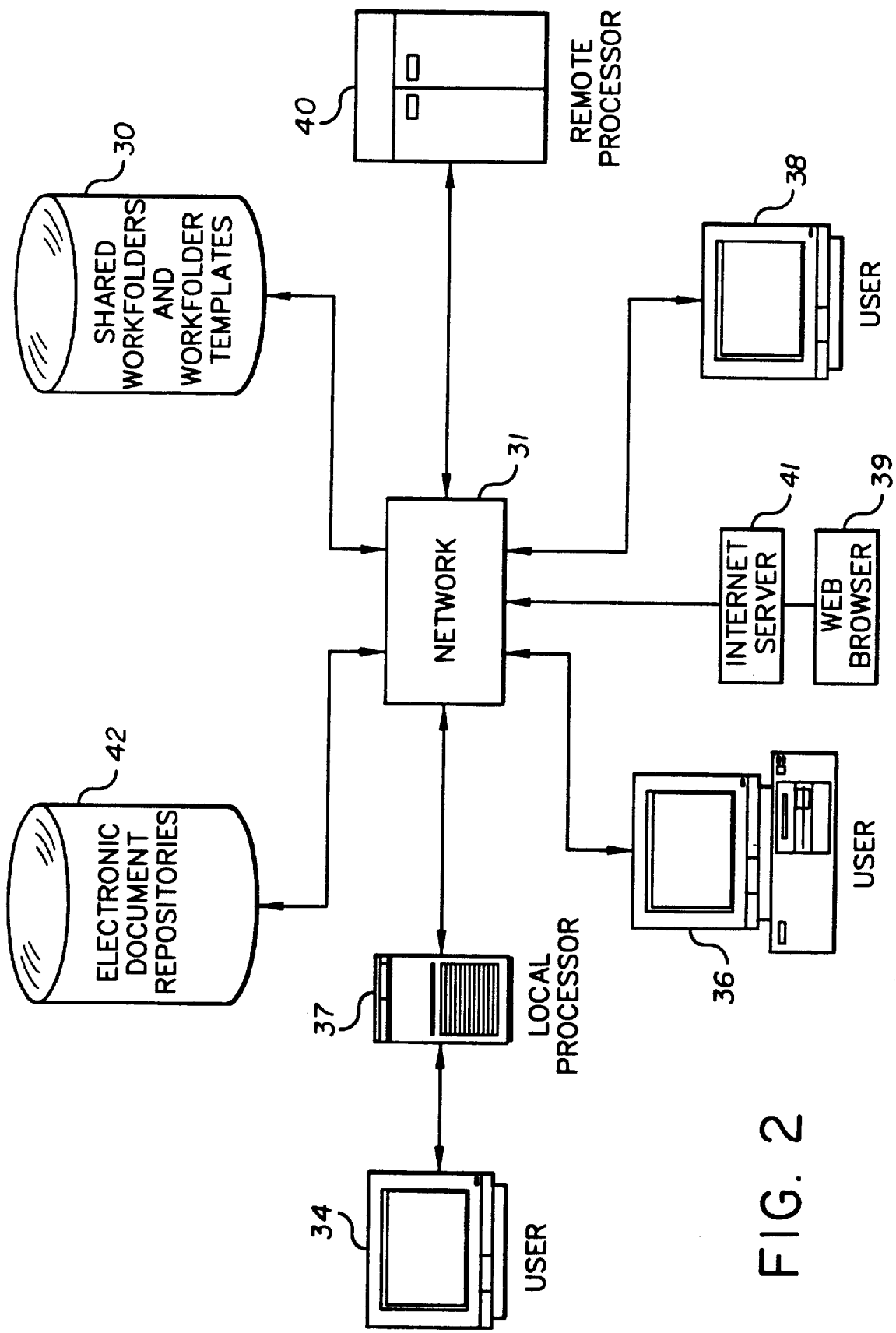
FIG. 2 is a system diagram of a networked computer environment utilizing shared WorkFolders according to the present invention.

FIG. 2 is a basic diagram of a networked computer environment utilizing shared, structured data objects, i.e. "WorkFolders." A WorkFolder environment can be created on a stand-alone computer platform but preferably, the WorkFolders and the supporting Workfolder environment (the "WorkFolder program") is implemented on a networked system. The WorkFolders are maintained on an electronic storage device 30 connected to a network 31 and thereby to a plurality of users 34–39. A user terminal may be a stand-alone computer (user 36), a terminal connected to a local processor 37 (user 34), a dumb terminal (user 38) which is connected to a remote processor 40, or a "Web-Browser" (user 39) connected to an Internet server 41. Network 31 may also provide access to one or more "external" document repositories 42. It is recognized that the data connections between elements illustrated in FIG. 2 includes both physical connections and remote data links, e.g, through wireless technology such as cellular modems.

Although the WorkFolder storage 30 is shown as a separate shared hardware element, those skilled in the art will recognize that it is immaterial whether this storage element is a physically separate entity or is housed within a local or remote processor connected to the network, or is a distributed storage system. All that is required is that the storage area 30 be accessible to each of the users. It is also recognized that the network 31 may be of any configuration, and in particular may be a conventional LAN, intranet, the Internet, or any combination of different network configurations. The electronic document repository 42 may be one or more of a local document management system, a data archive such as CD-ROM jukebox, or any other accessible data server, such as an Internet server accessible through its URL address.

In a collaborative work environment, it is critical that more than one user can access a given WorkFolder at the same time. According to the invention, data conflicts are not prevented by relying on a file locking scheme. Instead, the system provides an automated conflict "reconciliation" mechanism. Reconciliation takes advantage of the fact that, even though two or more users may be accessing and editing the same Workfolder at a given time, it is unusual for two users to alter the same data field at the same time, especially where various users have different areas of responsibility. Thus, according to an aspect of the present invention, the changes made by each user are analyzed to determine whether an actual conflicting update was made or whether the changes can be merged into a single WorkFolder combining both sets of updates.

Reconciliation is performed with or without user intervention, depending on the types of conflicts and whether the conflict is detected during a save or during public folder replication between servers. Reconciliation is performed when conflicts occur on a single server as well as when conflicts occur between WorkFolders that are copied to multiple server sites. This allows multiple users to make changes to the same WorkFolder simultaneously, whether they are on the same or different servers. The WorkFolder program detects conflicts, and either prompts users with the information needed to resolve each conflict interactively (attended reconciliation) or automatically resolve such conflicts according to a predefined set of rules (unattended reconciliation). Those skilled in the art will recognize that conflict reconciliation according to the present invention is not limited only to use in a WorkFolder environment, but can also be used to resolve conflicts created in many other shared data environments, for example, a shared database.

Attended Reconciliation provides for immediate mediation and resolution of the conflict by one or more system users. Attended reconciliation issues arise when multiple users are working on the same WorkFolders at a single site. Unattended Reconciliation occurs when multiple sites are involved. Rather than invoking a mediation dialog between users, conflicts are resolved according to a set of heuristic rules. Conflicts which cannot be resolved without user intervention are preserved within the data structure so that they may be corrected at a later date. In both types of reconciliation, the detected conflict and the resolution may be recorded in a history log associated with the WorkFolder so that the reconciliation process can be reconstructed or undone if required.

Generally, conflicts arise when two or more users make changes to a given WorkFolder at the same time. According to the present invention, when the second user saves their "copy" of the WorkFolder, the reconciliation logic in the WorkFolder program detects the potential conflicts. The first user to save does not encounter any conflicts since the version of the WorkFolder on the server has not changed since it was opened. When a subsequent user saves, however, the WorkFolder program detects that the version on the server is newer than the version the second user originally opened, and triggers attended reconciliation.

Figure 3A:
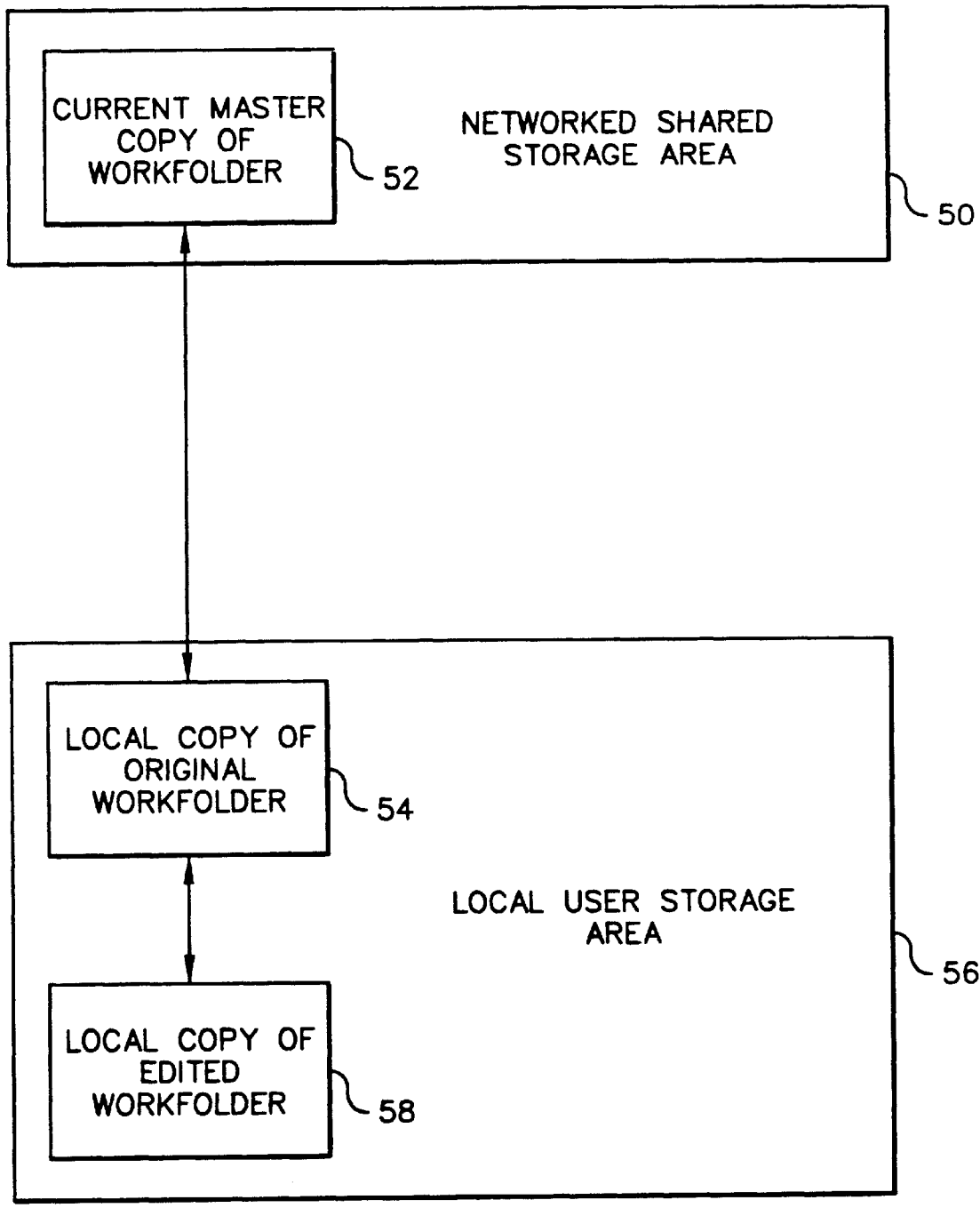
FIG. 3a is an illustration of the various copies of a WorkFolder which exist when a WorkFolder is edited and the location of those copies.

A typical networked data processing environment is illustrated in FIG. 3a. The "master" copy of a data object such as WorkFolder 52 is stored within the networked shared storage area 50. When a user edits the WorkFolder 52, a local copy 54 is transferred from the shared storage 50 to a local storage area 56 where it is readily accessible and may be modified by the user. Often, the original local copy of the WorkFolder 54 is preserved when the WorkFolder is edited and a separate local edit copy 58 is created. When the local edited WorkFolder 58 is saved, it can be compared to the local original copy 54 to determine what changes were made by the user and also compared to the master copy 52, which may itself have been changed by a second user in the interim.

According to the present invention, when a user edits the local copy 58 and then saves the edited WorkFolder (thus updating their local "original" copy 54), the reconciliation program compares the version of the most recently saved local copy 54 to the master version of the WorkFolder 52 on the server. If none of the detected changes to the WorkFolder are in actual conflict with any changes to the master copy 52 introduced by other parties, i.e., the changes are made to different data elements within the WorkFolder, the reconciliation logic merges the new version into the version on the server and the save succeeds. The updated master copy 52 may then be returned to the local server to refresh the user's local copy if necessary.

As an example, users 1 and 2 simultaneously open the same WorkFolder. User 1 attaches a document to the WorkFolder and changes a status data field to "completed." User 2 simultaneously opens another document in the WorkFolder and, based on its contents, enters the value of several other WorkFolder fields, i.e., current disbursements and income. Because neither user changed the same objects in the WorkFolder, the changes do not conflict with each other. Therefore, the changed and added data can be merged into the master WorkFolder. If both users change the same data field, i.e., user 1 changes the status field to "complete" while user 2 changes it to "on hold", and then both try to save the updated workfolder to the network storage area, the reconciliation logic detects the conflict and invokes an attended conflict resolution routine wherein one or both of the user's are prompted with a list of the conflicting changes and then asked to resolve, for each detected conflict, which of the conflicting values should persist in the master copy 52.

Figure 3B:
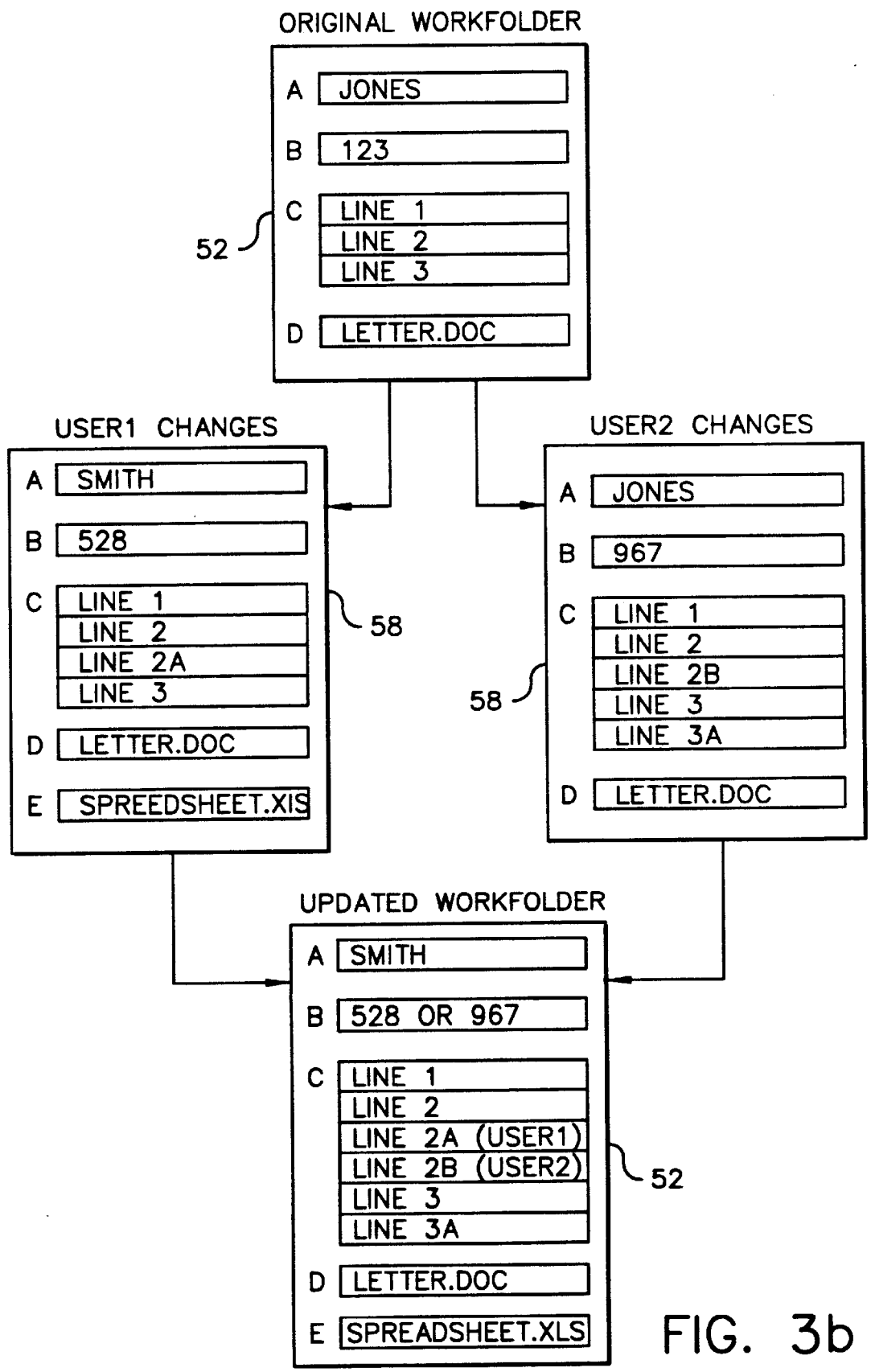
FIGS. 3b and 3c are illustrations of the contents of a WorkFolder which is edited by two users whose changes are then reconciled according to the present invention.

FIG. 3b illustrates attended conflict resolution according to the present invention. WorkFolder 52 contains several single-value data fields identified as A, B, and D, as well as a multi-value data field C. User 1 accesses the WorkFolder 52 and edits local copy 58 to alter the values of single-value fields A and B, add an additional element (Line 2a) to multi-value element C, and introduce new element E to the WorkFolder. User 2 alters the value of field B and adds line 2b to multi-value element C to local copy WorkFolder 58'.

When the two edited WorkFolders 58, 58' are saved, the WorkFolder program identifies the changes and intelligently determines whether there is an actual conflict in the updated data or whether the changes made by users 1 and 2 can be merged. In this example, field A was changed by user 1, but not user 2. This update therefore creates no conflict and therefore, the new value for field A is stored the updated master copy, WorkFolder 52'. Similarly, no changes introduced by User 2 to WorkFolder 58' interfere with the addition of element E to the WorkFolder 58 by user 1. Thus, element E is merged into the updated master WorkFolder 52'. Element C is a multi-value field. Thus, the additional values from user 1 and user 2 can be included without generating a conflict (provided that the several values in field C are independent of each other). The updated element C includes original lines 1–3, new line 2a from User 1 and new lines 2b and 3a from User 2.

Figure 3C:
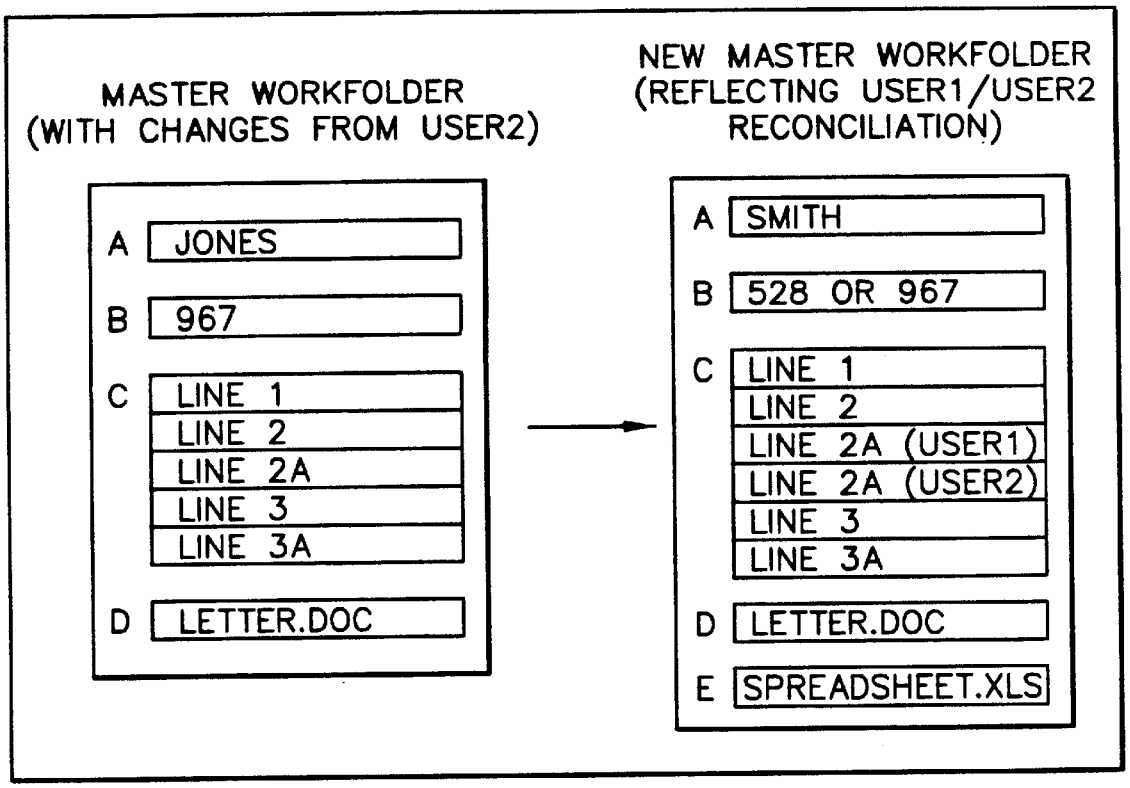
Figure 3C:
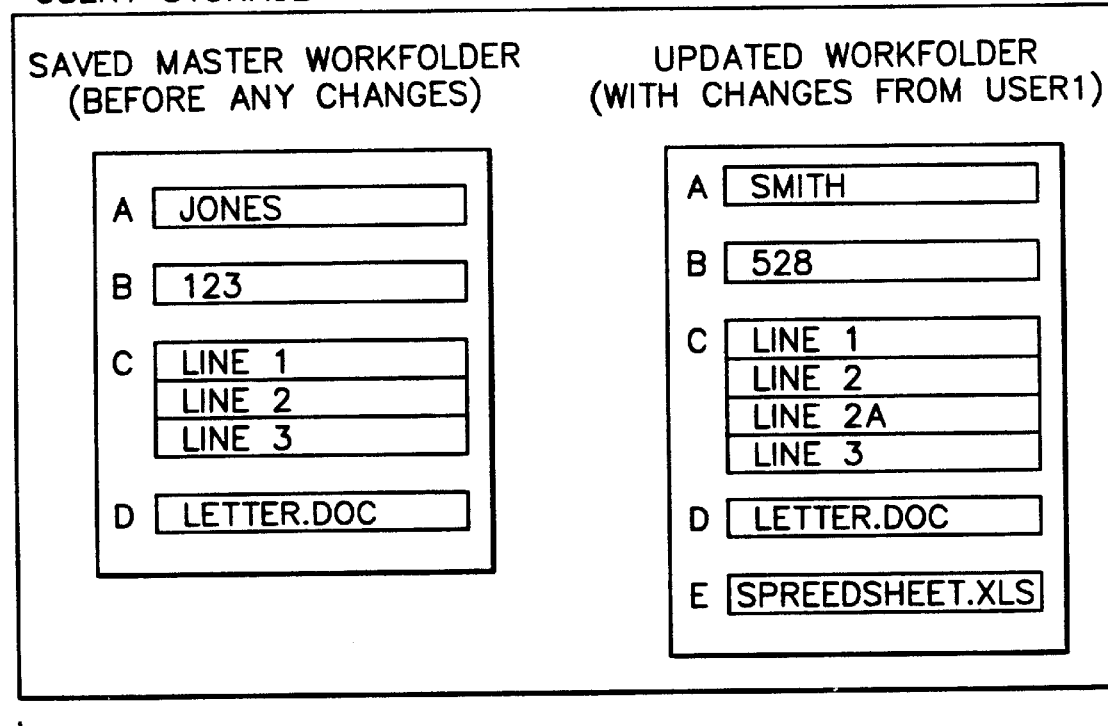

In contrast, the value of field B was altered by both user 1 and user 2. According to the attended mediation scheme of the present invention, the last party to save their WorkFolder will be notified of the conflict when the WorkFolder is saved and presented with conflict resolving information, including for example, the two conflicting values of field B and the name of the other party to the conflict. In this situation, if user 2 was last to save, a notification would be provided that the changes to field B conflicted with data entered by User 1. User 2 would then be asked to choose between the conflicting data values. It is understood that User 1, as well as third party users, may also be notified of the conflict and permitted to participate in the conflict mediation process. In addition, priority may be assigned to users, so that, for example, User 2 may be able to override a change made by user 2, but not by user 1. To facilitate this exchange, a log of changes to a WorkFolder, including the changed element and the name of the user who made the change, may be generated. Preferably, this log is stored in a history "meta-element" associated with the specific WorkFolder. Other log elements, such as the time a change was made, the previous value of the field, etc., may also be recorded. FIG. 3c illustrates the state of the Master work folder 52, and the local and edited copies 54, 58 of user 1, both before and after the reconciliation described above when the user 2 changes were saved first. Note that the local copy 54 of the updated WorkFolder for user 1 has not been refreshed to reflect the changes from user 2.

Figure 3D:
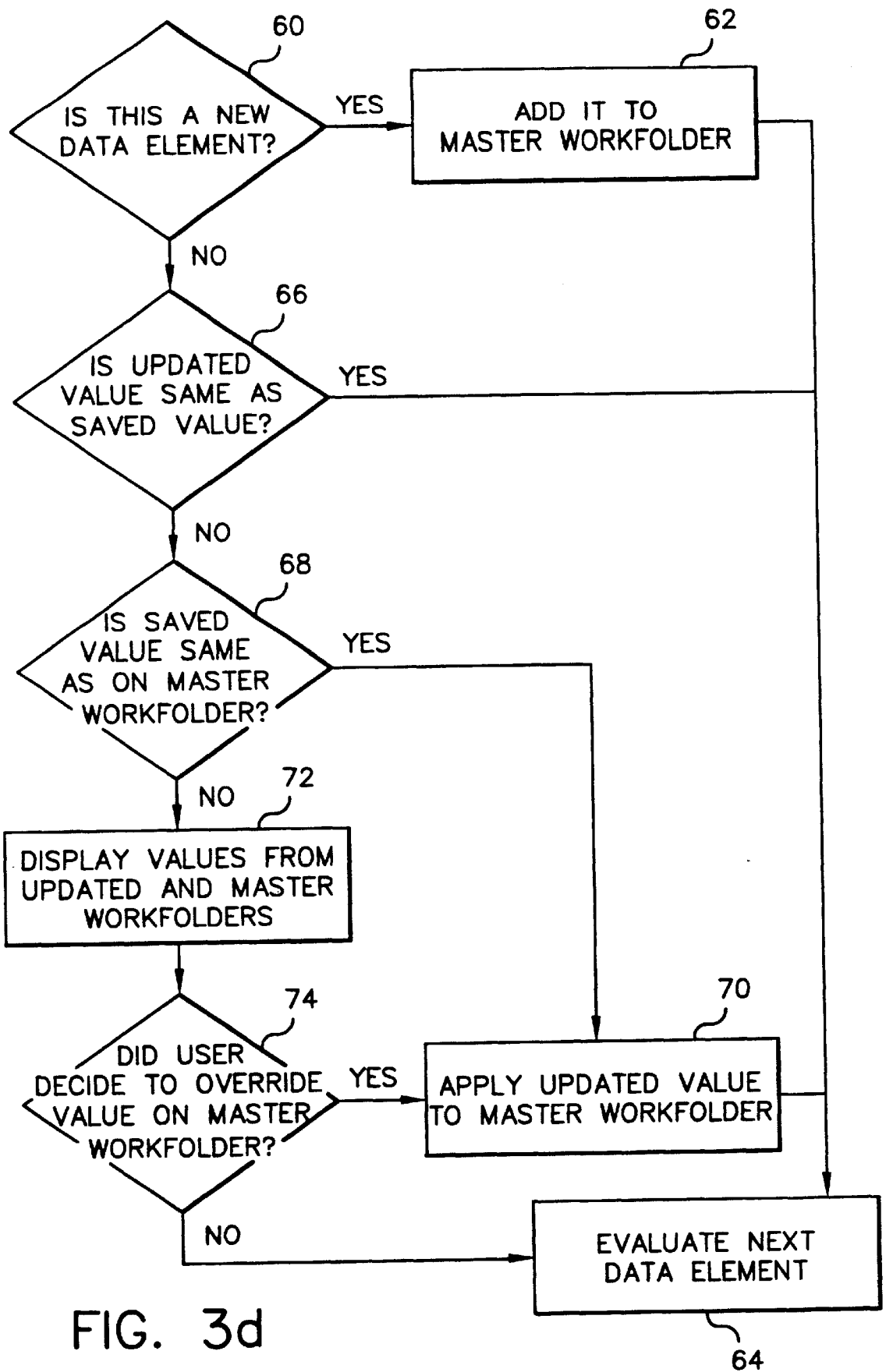
FIGS. 3d–3f are flowcharts illustrating one method of reconciling changed WorkFolder data elements in a multi-user environment according to the present invention.
Figure 3E:
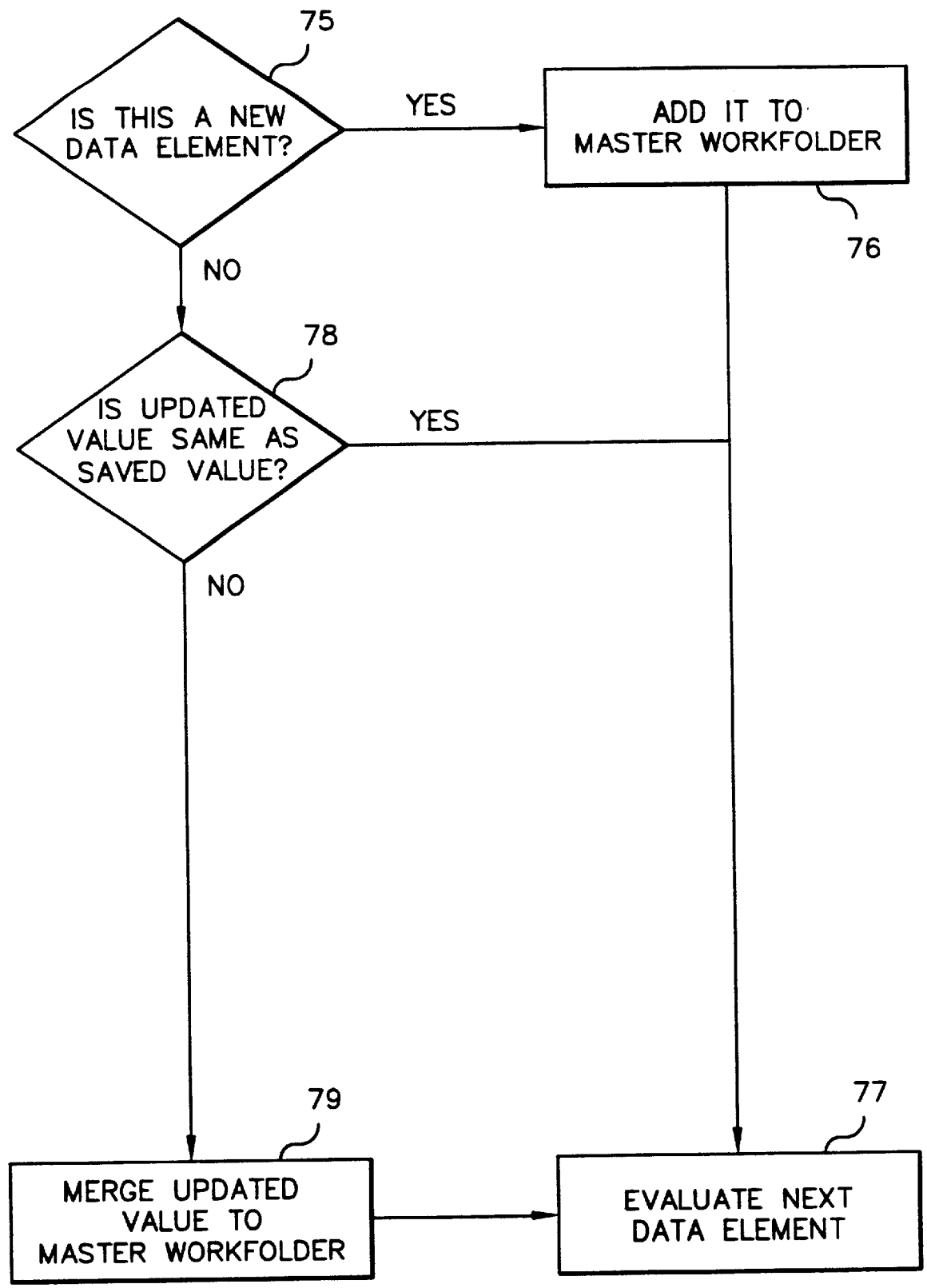
Figure 3F:
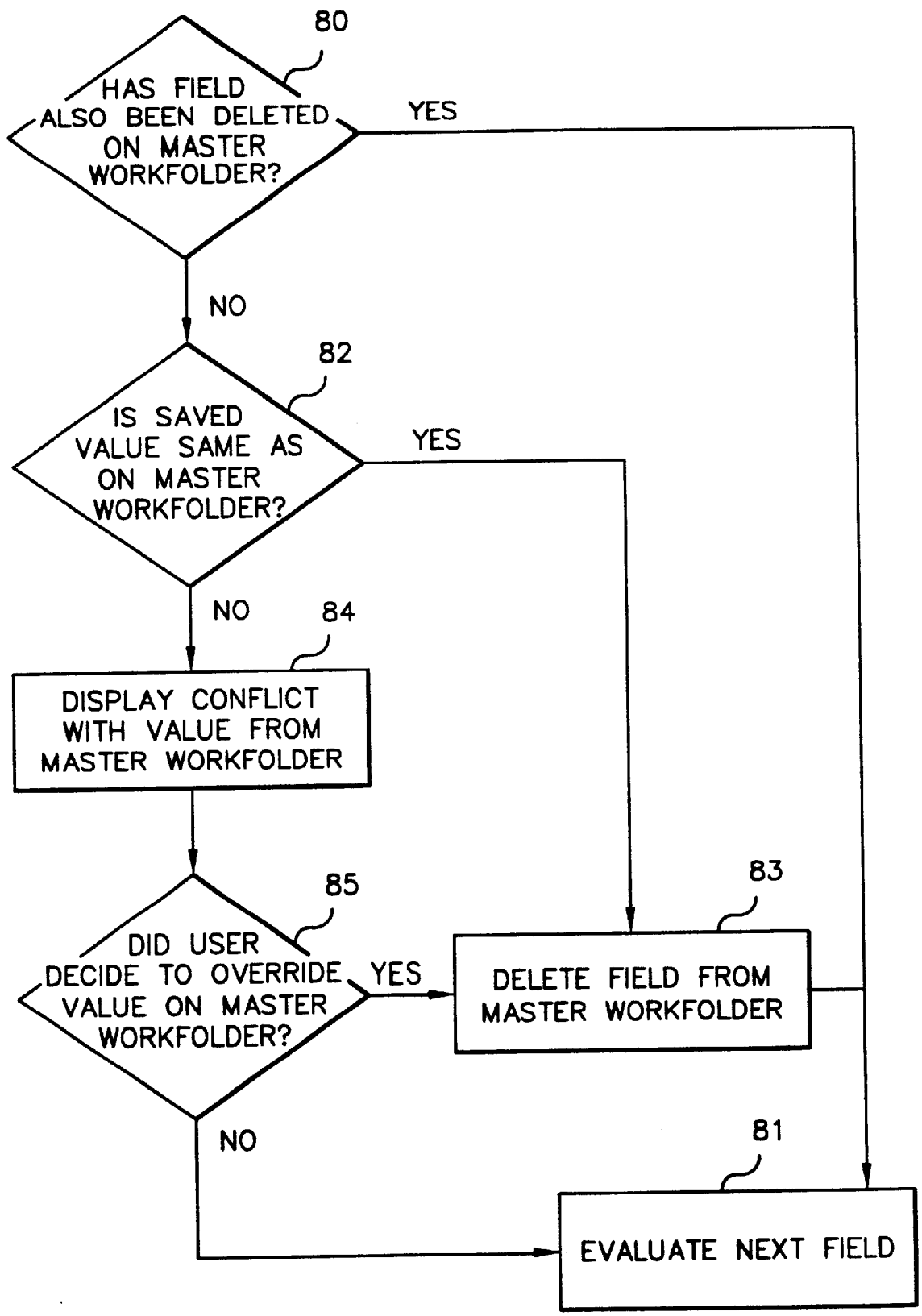

One implementation of a method of Attended conflict resolution according to the invention is summarized in the flowcharts of FIGS. 3d–3f. FIG. 3d is a flowchart of the reconciliation of a single-valued data element which is added or updated by a user. When an updated WorkFolder 58 is saved, each data element in the WorkFolder is examined and compared with the current master copy of the Work-Folder 52. Comparisons may also be done with the local copy of the original work folder 54 for efficiency reasons. First, the element is examined to see if is a new data element. (Block 60). If it is, the new element is added to the master copy 52 (block 62) and the next field is evaluated (block 64). If not, the element is examined to see if any changes have been made (block 66). This may be done by comparing the edited WorkFolder 58 with the local original copy 54. If the value of the element is the same (i.e., it has not been changed), there is no need to update the master copy 52 and the next data element is evaluated.

If a data element has been changed, the value of that element in the local (unupdated) copy of the original Work-Folder 54 is compared with the corresponding element in the master copy 52 (block 68). If the values are the same, it indicates that no other user has updated that data element in copy 52 since the local copy 54 was made. Therefore, the change introduces no conflict and the updated value is applied to the master WorkFolder 52 (block 70). However, the condition where the data element on the local copy 54 differs from the master copy 52 indicates that another user has changed that element and updated the master copy 52 sometime after the present local copy 54 was created. This situation represents a true conflict which is resolved by mediation (block 72) as discussed above. If the result of the mediation is that the user decides to override the value on the master copy (block 74), then the updated value is applied to the master copy (block 70) and the next field is examined. Otherwise, the updated value is dropped from the Work-Folder and the present value in the master copy 52 remains unchanged. A record of both the stored value, the discarded conflicting value, and the names of the users involved is preferably stored in the history log for that workfolder 52.

FIG. 3e is a flowchart of the reconciliation of a multi-valued data element added or updated by the user. The first step is determining whether a sub-element in the multi-valued data element is new. (Block 75). If so, it is added to the master WorkFolder (block 76) and the next data element is evaluated (block 77). If not, the data element is compared to the corresponding element in the saved local copy 54 to determine if it has been changed by the user. (Block 78). If the values are the same, the element has not been changed and the next data element is evaluated. If the value has been changed, it is merged into the multi-valued data element of the Master WorkFolder 52 (block 79) and the next field is evaluated. Thus, for example, if two users change the same entry in a multi-value data element, the union of the changes will be preserved, i.e., the single original entry will be replaced with two new entries.

FIG. 3f is a flowchart of the reconciliation of a deletion of a single or multi-valued data element. The initial step is to determine whether the data element (e.g., a field) deleted by the user has also been deleted in the Master WorkFolder 52. (Block 80). If it has, nothing need be done and the next field is evaluated (block 81). If it has not, the value of the deleted field in the local copy 54 is compared with the master WorkFolder 52 to determine if the field has been altered by another user since the local copy 54 was created. (Block 82). If the values are the same, then no one else has updated that field and it is deleted from the master WorkFolder 52. (Block 83). If the compared fields differ, then the field was updated by another user after the local copy 54 was created. This creates a true conflict which is resolved by mediation. (Block 84). If the user decides to override the new value in the master copy and to delete it anyway (block 85), the field is deleted from the master WorkFolder 52. Otherwise, the deletion is not performed and the next data element is evaluated (block 81). As above, a record of the deletion, including perhaps the deleted value, is preferably added to the history log.

During mediation, the user whose WorkFolder save resulted in a conflict detection is preferably presented with a conflict mediation message which includes details regarding the conflicting data itself and also information including which other users are involved in the conflict or may be otherwise affected by it and when the conflicting changes were made. The conflict mediation messages can also be presented to other users, such as the owners of the first-saved conflicting data or a third party, such as a supervisor. One or more users are then prompted, preferably in real time, to resolve the conflict by selecting which conflicting data item should be kept.

In the preferred embodiment, a WorkFolder is implemented with the full collection of elements illustrated in FIG. 1. Thus, a conflict can be introduced by changes made to any one of these fields. Below is a list of the general types of conflicts which can occur in a workfolder environment as the contents, attributes, and structure of a WorkFolder are modified, along with the preferred method of resolution.

(A) Conflicting changes to any attributes of an item, including sections, placeholders, documents, fields, etc.:

When a user's workfolder save results in a conflict, user is presented with the a mediation dialog message that indicates conflicting changes and allows the user to choose which change should persist. In some instances, specifically regarding multi-value attributes, an option may be provided to merge the conflicting changes so that resulting attribute list is a union of all user's changes. In other instances, the attributes and contents of an item, such as the name and contents of a single-value data field, may be treated as a single value. Conflicts to either attributes or data for these items are treated as a single conflict that must be resolved as a unit. For example, user A changes Field "ZIP Code" to "12345" while User B changes the name of the Field to "P.O. Box." When the last save occurs, one or more users are notified of the conflict and allowed to choose which version of the field to preserve.

(B) Conflicting changes to the placement or organization of a WorkFolder such as conflicting movement of items between or within sections:

In the preferred embodiment of the invention, this condition will not result in a user resolvable conflict, primarily because a large amount of data will generally need to be presented to allow the conflict to be resolved. Preferably, the most recent set of changes to the data order is preserved by default and a message is generated to inform affected users of the default conflict resolution. Details regarding the unadopted ordering are preferably preserved in the history log and a mechanism is provided to override the default selection and replace it with the overridden ordering.

(C) Changes to the contents or attributes of an item that has been deleted by another user, or deletion of an item that has been modified by another user:

Preferably, the user(s) are presented with a conflict mediation dialog message and permitted to choose whether to keep the item in its changed state or proceed with the deletion.

(D) Conflicting changes to the content of an embedded file (i.e., document, image, script, etc.) or the same placeholder filled with two different documents:

Evaluation of the contents of attached documents is generally complex, particularly when the documents are lengthy, or there are a wide variety of formats. Thus, the reconciliation system is generally ignorant of an attached document's contents. In this situation, actual reconciliation preferably is not performed at the time of the save. Rather, according to the invention, the affected user(s) are notified that an embedded content conflict has occurred but that resolution of the conflict deferred. In the most preferred embodiment, the conflicting documents are both stored in the WorkFolder as alternate "sub-items", where each sub-item is one version of the actual document content or filled placeholder. When a WorkFolder's contents is displayed, the sub-items can be grouped together and identified as representing conflicting alternatives. This may be done automatically by providing sub-items with a special "in conflict" attribute tag. Preferably, any user with the appropriate modify rights can resolve this conflict by explicitly selecting which of the conflicting content documents should be preserved. Preferably, the unselected sub-item is then automatically deleted. The conflict also automatically resolves itself if all but one of the conflicting sub-items are deleted or moved elsewhere in the contents.

In some cases, such as when the conflicting documents are known to have the same format, a specialized document compare routine (either integral with the reconciliation system or part of an external software package, such as a word processor) is used to perform a comparison of the documents and list the document conflicts for resolution by the user.

Preferably, when the location of such a conflict object is moved within the workfolder structure, the sub-items versions are moved with it. If the conflict object is deleted, all of the sub-items, which hold the actual conflicting versions of the content are deleted as well. The actual content of a version of a document in conflict can be modified, access rights permitting. It is therefore possible for two users to modify the same sub-item, thus generating additional conflicts. These additional conflicting versions can be displayed as more sub-items underneath the top-level conflict that already exists.

In addition, since each version of a document in conflict can be edited independently of its other versions, it is possible to view history for each distinct version of the conflicting document. The history for a version of a document in conflict will show its history merged with all of the history of the document prior to when it split into conflicting versions. Therefore, two different versions of a conflicting document may have different recent history, but will share the same history up until the point at which the conflict occurred.

It should be noted that a content conflict only occurs with attached content. If the placeholder or document only references external content, and does not contain an attachment, then all users who edit the referenced content are doing so by accessing exactly the same bits in exactly the same location. Preferably, issues of simultaneous access to externally referenced content are managed by a document management system, file system, or viewing application, but not by the primary reconciliation system.

In addition, in the preferred embodiment, an embedded functional script that is in conflict will not be available for automatic execution until the conflict is resolved. Instead, when a WorkFolder containing conflicting scripts is opened by a user, a message will be provided to indicate the problem and provide a means for resolution, such as selecting one script to preserve and deleting the others.

(E) Embedded Discussions:

In the preferred embodiment, a workfolder contains an area in which a threaded discussion related to the workfolder is stored. Entries to a threaded discussion do not generate conflicts that need to be resolved by a user. Because a user can only add comments to an existing conversation topic or start a new topic/conversation thread, it is not possible for two users to make conflicting changes to the same item in the discussion. Since it is possible for two users to add different sets of comments to the Discussion simultaneously, the reconciliation logic merges these changes in date/time order upon save, so the reconciled version of the WorkFolder reflects the addition of all comments by all users.

It is possible for a user to make continual changes to their own "leaf'-level comment as long as no one has replied to it. In the event that a user makes changes to their own comment while someone else simultaneously replies to an earlier version of it, the reconciliation logic adds both versions to the discussion. The user's modified comment appears with no replies and the earlier version appears with the reply by another user.

(F) Embedded History log:

Preferably, each WorkFolder contains an embedded history which includes a log of changes made to a the workfolder. In the preferred embodiment, the history log never generates conflicts that need to be resolved by users because entries from all instances are merged together, i.e., in date/time order. Where users make conflicting changes to the WorkFolder that require user intervention for resolution, the history log preferably contains entries for both the modifications that were kept and those which were overridden. In this manner, the log reflects all attempted changes to the WorkFolder that were made.

In a preferred embodiment, and in addition to being able to resolve conflicts dynamically on an item-by-item basis, the reconciliation system also allows dynamic resolution of multi-conflict situation, such as when several items changed by one user are in conflict with changes introduced by another. Preferably, the mediation dialog provides the user (s) with the option of selection all changes made by a specific user to survive, rather than selecting resolving the conflicts one at a time. In addition, a user is given the option to cancel the save operation altogether. Further, for any given conflict presented in the mediation dialog, the user is preferably given the option to see a full textual explanation of the conflicting changes at issue. In one embodiment, this option is presented as a "Details" button shown next to each conflict in the mediation dialog.

According to another primary aspect of the present invention, reconciliation can be performed without user input. This is known as unattended reconciliation, and can be performed on the client side or the server side. Unattended reconciliation is particularly useful in environments where WorkFolders are mirrored to two or more separate data servers, each acting as a local shared data storage area. The basic algorithms for unattended reconciliation are similar to that for attended reconciliation. However, instead of resolving true conflicts by mediation, as in attended reconciliation, the conflicts are either resolved by a series of predefined rules or resolution is deferred until user input is provided.

When multiple users at multiple sites edit WorkFolders stored in different public folders, i.e., different shared storage areas, conflicts are likely to occur when the WorkFolders are replicated across each site. Conventional network environments typically have a native conflict handling routine to prevent a newly edited data file existing on one site from being overwritten by a newly edited data file that is being replicated from a remote mirror site. According to the invention, the reconciliation program overrides, in whole or in part, native conflict handling routines. This can be done, e.g., by defining a specific message class which is used to separate replicated data objects which should be processed by the present reconciliation system, such as WorkFolders, from other replicated objects, i.e., system files which may be processed by native routines.

In client side unattended reconciliation, when the defined message class is detected during replication across sites, indicating that a received data object is a replicated workfolder, the received workfolder is compared to the copy of the workfolder presently existing at the local client. If a conflict is detected, the workfolder is tagged as being in conflict but resolution itself is preferably deferred. Instead, the users involved in the detected conflict are identified and a conflict notification message is sent to each, i.e., via e-mail. Preferably, this message includes a mechanism which identifies the workfolder in a manner which allows it to be opened immediately. When a WorkFolder in conflict is opened on its home server, for example, the server on which it was originally created, it is automatically reconciled on the client side using the unattended reconciliation algorithms, discussed below, without user intervention.

Reconciliation may also be performed on the server side of a network environment. This type of reconciliation service resolves replication-induced WorkFolder conflicts without user intervention. In the preferred "Microsoft Exchange" environment, the reconciliation service is installed at each site on each server that is a home server for public folders containing WorkFolders. The reconciliation service is preferably installed so that it starts when its mirror server software (i.e., Microsoft Exchange) is started and stops when its mirror server program is shut down. Unattended reconciliation may be performed on demand or be run by a scheduling agent that is as closely tied to the folder replication schedule as is needed.

In the preferred embodiment, as workfolders are replicated across the various servers in a network, a basic conflict check is performed to determine if a possible true conflict exists. This check may be as simple as determining whether the time-stamps of a replicated file and the file it is to replace indicate that both have been edited. If a replicated workfolder is determined to have been changed by multiple users, a conflict message is generated, regardless of whether a true conflict exists. Preferably, this first-pass conflict checking is performed by the underlying network environment software, such as Exchange. Copies of the possibly conflicting workfolder are stored so that they may be later processed by the reconciliation system.

When an unattended reconciliation on a server is enabled, the public folder store on the server in which WorkFolders are stored is browsed to locate conflict messages related to WorkFolders. If WorkFolder-based conflicts are found, the identified conflicting workfolders are analyzed and "conflicts" are resolved according to a predefined set of rules. The conflicting WorkFolder versions are then combined to create a single version of the WorkFolder which is no longer in conflict.

When replication occurs and a WorkFolder is determined to be in conflict across sites, a WorkFolder conflict message is sent to all sites on which the WorkFolder has been replicated. According to the present invention, however, it is only on the home server for that particular WorkFolder where the Reconciliation service resolves the conflict. This prevents a scenario where a never-ending cascade of conflicts are generated as the WorkFolder is reconciled at multiple sites and then replicated, resulting in further conflicts.

One consequence of reconciling a the WorkFolder only at its home server is that the other sites will still have the conflicting version of the WorkFolder until the next round of replication moves the reconciled version of the WorkFolder out to the mirror sites. If a user at a mirror site opens the recently reconciled WorkFolder before the reconciled version has been sent to their local mirror, the WorkFolder is preferably opened as read-only and the user is presented with a message indicating that the conflict-resolved WorkFolder must be copied to the local sever. Alternatively, a fetch request can be performed to initiate replication of the reconciled workfolder if it is needed before a normal replication process is executed.

The WorkFolder Reconciler is preferably run on every server that has a Public Information Store. This is because every Public Information Store has the potential to store WorkFolders that are saved in public folders and that can be accessed by multiple users simultaneously, thus potentially generating conflicts. There are exceptions to this rule, however. One is the case where an administrator has configured a server in the organization to only house mailboxes, and never to store public folders and their contents. Another scenario occurs when a server will never be used as the home server for any public folders.

Since the Reconciliation service is preferably on a schedule that is configured by the administrator, it is possible that reconciliation will not occur for a WorkFolder in conflict immediately after public folder replication. This leaves a window of time during which a user (at the site containing the home server) can open the WorkFolder and, not realizing it is in conflict, expect to be able to modify it. In order to handle this scenario, the same unattended reconciliation rules that are used by the server-side WorkFolder Reconciliation program are also used on the client-side WorkFolder reconciliation routine. If a user opens a WorkFolder that is in conflict (again, only at the site containing the home server), the client performs an automatic unattended reconciliation immediately before the WorkFolder opens. By the time the WorkFolder is displayed to the user, this client-side reconciliation is complete and the WorkFolder, both at this client and on the home server, is no longer in conflict. In this case, when the scheduled Reconciliation Service kicks in, this WorkFolder is no longer a candidate for reconciliation since it is no longer in conflict. Thus, the client-side logic accomplishes the very same job that the server-side logic would have done, had it gotten there first.

Figure 4:
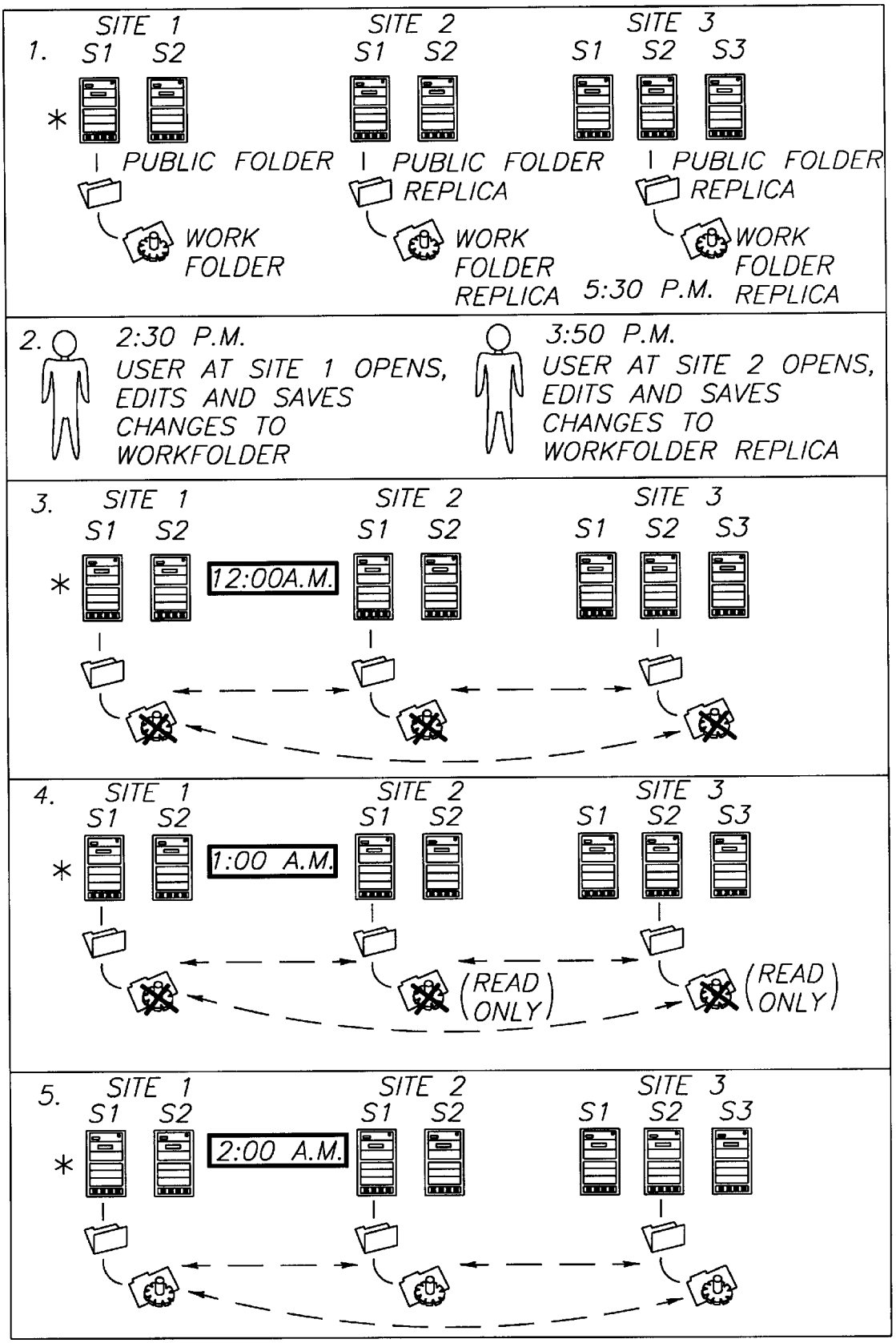
FIG. 4 is a diagram illustrating one example of unattended conflict reconciliation across multiple servers.

FIG. 4 is a diagram illustrating a preferred embodiment of the unattended reconciliation process as described above in a Microsoft Exchange environment where workfolders are stored in Exchange public folders. Three network server sites are shown, Site 1, Site 2, and Site 3. At Site 1, server 1 (S1) is a Home Server to a public folder containing a workfolder. This is indicated by the asterisk (*) next to S1. Replicas of this public folder are stored on one server at each of the other two sites. The replicas were created during a standard public folder replication process. This state is represented as step 1.

In step 2, two users edit and save different copies of the same workfolder. User A edits the workfolder at Site 1 and saves the edited workfolder on its home server. User B edits and saves a replica of the same workfolder. The changes made by users A and B are in conflict.

In Step 3, conventional public folder replication occurs, here at midnight. Because both the original and replica of the workfolder have been edited, an initial conflict message is generated and left at each of the three sites. The conflict is not resolved at this point. According to the invention, however, if a user of the home server at Site 1 were to open the Workfolder in conflict before reconciliation was performed, unattended client-side reconciliation would be initiated.

In Step 4, the reconciliation service installed at Site 1, server S1 (because this site is a home server to a public folder) "wakes up" and searches for relevant conflict messages. When the conflict message generated in Step 3 is discovered, the conflicting workfolders are analyzed and the conflict is resolved according to predefined unattended reconciliation rules. At this point, the workfolder existing on the home server is no longer in conflict. However, the conflict in the replicas of this workfolder at Site 2 and Site 3 has not been resolved because the reconciled workfolder has not yet been replicated. According to one aspect of the invention, the currently existing workfolder replicas at sites 2 and 3 are marked as read-only and a user attempting to edit the (older) replicas would receive a message indicating that the workfolder will remain read-only until public folder replication is performed. Optionally, the user may then be permitted to initiate this action.

Finally, in Step 5, scheduled public folder replication is performed. The reconciled workfolder is therefore distributed from Site 1 to Site 2 and Site 3. A user at any one of these sites now has full access to the reconciled workfolder.

According to this aspect of the invention, the unattended reconciliation logic does not require user intervention because it is rule-based. There are a wide variety of possible rules which may be implemented, depending not only on an analysis of the data conflict itself, but also on factors such as the importance of the region of a WorkFolder in which the conflict occurred, the users who created the conflict and their authorization rights, etc. The discussion below describes one specific set of default conflict resolution rules, tailored for WorkFolder conflict resolution. However, as will be apparent to those of skill in the art, different rules and algorithms may be used, and these and other rules may be applied to non-WorkFolder data items.

Preferably, the primary default rule is that the last update wins, although a record of the "losing" entry is made in the history file and notice can be sent to the affected users. An exception exists for conflicts with documents. When a document conflict is detected, both documents are saved as sub-items in the WorkFolder and a conflict condition is indicated. When the WorkFolder is next retrieved, the conflict will be detected and resolution, e.g., by mediation, is initiated. Where two users have updated a WorkFolder but there are not actually any conflicting changes to the same data elements within the WorkFolder, the two conflicting WorkFolder versions are generally merged. After the merge, the reconciled WorkFolder contains the union of all changes made. The history log also reflects all of the changes made by all of the users who worked on the conflicting versions.

An object within the WorkFolder that was deleted by one of the users is not deleted in the reconciled version, unless it was deleted by all of the users that are involved. For example, if user A deleted a placeholder and user B performed unrelated work on other objects in the WorkFolder, the placeholder is not deleted in the reconciled version. The history, however, will reflect the fact that user A deleted the placeholder.

In a case where two or more users made conflicting changes to the same object within the WorkFolder, the WorkFolder system recognizes this as a true conflict and the unattended reconciliation operates according to the following set of rules:

(A) Conflicting changes to any attributes of a content item, including sections, placeholders, documents, fields, etc.:

Generally, the most recent changes are preserved. However, in the preferred embodiment, changes to certain attributes, such as the list of applicable status values, are combined so that the union of values is preserved.

(B) Conflicting movement of items between or within sections:

The most recent order is preserved.

(C) Any changes to an item that has been deleted by another user, or deletion of a content item that has been modified by another user:

Regardless of the time order of the modifications, the changes take precedence over the deletion and the item will remain in the WorkFolder in its changed state.

(D) Conflicting changes to an attached document's content, or the same placeholder filled with two different documents:

As in the case of client-side interactive reconciliation, the Contents pane shows a conflict object that contains the conflicting versions of the actual content as sub-items. Preferably, the resolution of this conflict is done by the user manually and the unattended reconciliation system does not attempt to interpret content documents.

(E) Discussion:

The additions to the discussion are merged, preferably in date/time order, under the appropriate topic and conversation thread, so the version of the WorkFolder on the server reflects the addition of all comments by all users.

(F) History:

Additions to the history log are merged in date/time order.

Distributed work environments can also be established in a mobile data environment. It is therefore preferable that one or more users be able to download their work to a remote or mobile computer. For environments which use data objects such as WorkFolders, which can include links to external documents, it is preferable that the user be able to disconnect from the network and still be able to access not only the data within the WorkFolder, but also the contents of remotely linked files.

According to a further object of the present invention, a WorkFolder is initially transferred from a central storage area to a remote storage area using conventional network file transfer protocols. The remote unit is configured to initiate the WorkFolder program when it detects that a WorkFolder is being transferred. The WorkFolder program running on the remote unit then extracts all links in the WorkFolder which point to external documents and initiates a fetch from the network of some or all of the linked documents. The fetched documents are stored in a designated area on the remote system. The document links in the remote copy of the WorkFolder are then changed so that they point to the fetched files on the remote system and not the files on the network. When the remote user transfers a WorkFolder back to the main system, the process is performed in reverse. A conflict check is also performed and reconciliation is initiated if needed.

In a specifically preferred embodiment, a WorkFolder environment, entitled WFX, containing and supporting one or more WorkFolders operates in a Microsoft Windows 95 or Windows NT 4.0 environment in conjunction with a Microsoft Exchange Messaging infrastructure. The Exchange Messaging infrastructure provides ready support for a multi-user environment, including functions such as shared message repositories known as Public Folders, a globally accessible address book and the ability to send messages, such as conflict notices, to any user in the global address book. The Microsoft Exchange Messaging infrastructure is defined in the Microsoft BackOffice Software Development Kit (SDK), and specifically in the Microsoft Exchange Software Development Kit and the MAPI (industry-standard Messaging API) Software Development Kit, both available from Microsoft Corporation, of Redmond, Wash., USA. Significant supporting documentation is found in technical articles in the Microsoft Developers' Network library. However, all of these functions may also be incorporated directly in the WFX program if required.

Preferably, the hardware environment comprises a high end network server running Microsoft Exchange Server 5.0 or above and one or more client workstations running Microsoft Windows 95 or Microsoft Windows NT 4.0 or above and a Microsoft Exchange or Microsoft Outlook client. The WFX WorkFolder program is written in the C++ programming language, although it is recognized that other programming languages may also be used.

In a specifically preferred embodiment, the WFX program is a MAPI (industry-standard Messaging API) form handler, which is registered in the Exchange environment as the viewing application for a set of MAPI message classes. This registration process consists of the WFX program making conventional MAPI function calls which instruct Exchange from that point onward to always invoke the WFX program when the user attempts to view any message in a certain set of WFX-derived message classes. Once invoked, the WFX program makes additional MAPI function calls to load the actual WorkFolder data, which is stored in a MAPI message on a Microsoft Exchange server. After the user changes or adds various data elements to the WorkFolder and requests to save the WorkFolder, the WFX program makes additional MAPI function calls to write the WorkFolder back as a MAPI message to the Microsoft Exchange server and to initiate and perform the reconciliation process. In all cases mentioned above and below, the WFX program uses conventional MAPI function calls and/or Microsoft Exchange Software Development Kit function calls that are known to programmers skilled in the art.

In this specific embodiment, the WFX program formats each WorkFolder as an Exchange message. Therefore, WorkFolders can be placed in an Exchange Public Folder so that multiple users can simultaneously access and work on the same WorkFolder. WFX utilizes the Exchange mail infrastructure to distribute and process work. Thus, a WorkFolder can also be sent directly from one user to another. The fields data elements are made available to third party applications by defining them as Exchange named properties. Templates for WorkFolders are stored within the Exchange Forms subsystem. Each WorkFolder template is tagged with application data that instructs Exchange to call the WFX program when the user creates a document using a WorkFolder template.

In the preferred embodiment of the invention, the Reconciliation feature described above has a server-side implementation and a client-side implementation. Both components use a combination of Microsoft Exchange Software function calls and MAPI function calls in order to (1) detect that a WorkFolder message has generated an Exchange conflict message, (2) extract and present conflict information to a user, and (3) resolve the conflict. Since the WorkFolder system will reconcile conflicts on its own, it is necessary to override the standard Microsoft Exchange conflict handling mechanisms. This may be easily accomplished using standard features of the Microsoft Exchange and MAPI Software Development Kits which will be apparent to those of skill in the art.

The WorkFolder reconciler system functions as a Windows NT service. The WorkFolder installation process automatically configures it as this service and sets it up as dependent on the Exchange Server (also a Windows NT service). This means that the WorkFolder Reconciler Service will not run unless the Exchange Server is running. In this configuration, the WorkFolder Reconciler must log onto Exchange just like any other Windows NT Service that involves messaging. Therefore, it must have an account associated with it. Preferably, this account is automatically set up during the first-time WorkFolder installation process.

Preferably, the WorkFolder Reconciler service writes events into the Application Log of the computer where the Reconciler Service is running. There are two types of events: error and information. The type of information events logged may be determined by Logging Level settings defined by the user. Error events are always logged. Information type events include items such as starting and stopping a reconciliation, details about the number of conflicts discovered, and details relating to reconciliation itself. Event ID and Error events include items related to problems defining MAPI profiles, logging onto an appropriate server, retrieving address book information, modifying or accessing files, etc. Preferably, all error events will contain the error code in the Data field of the event. The reconciler service will continue to run whenever a non-severe error occurs. However, some errors are severe and the reconciler service cannot continue to run. In such cases, the reconciler will stop after logging the error event.

In order for the WorkFolder Reconciler service to reconcile all public folders that contain WorkFolders, it needs write access to these folders. In the preferred embodiment, the WorkFolder Reconciler is an NT Service, with an associated account. Thus, this account must have the appropriate access rights on every server that is running the WorkFolder Reconciler to accomplish its task.

In a specifically preferred embodiment, the WFX program presents the WorkFolder information to the user through a conventional Microsoft Windows GUI protocol with pull-down menus and tool bars. A WorkFolder may be created and edited using standard commands such as insert, delete, copy, cut, and paste.

Figure 5:
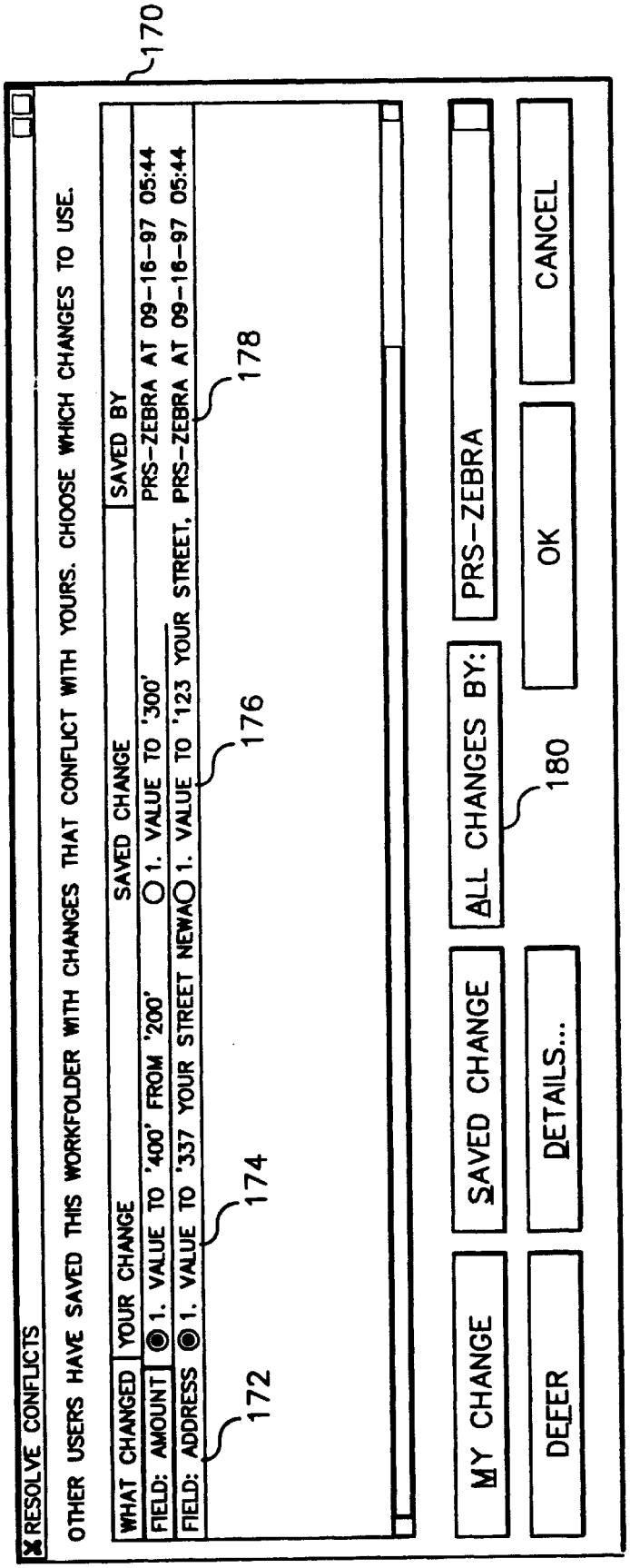
FIG. 5 is a conflict mediation dialog box according to a preferred embodiment of the invention.

FIG. 5 is an illustration of a conflict mediation dialog box 170 which is presented to a user during an attended reconciliation procedure. As discussed above, when a user saves an edited Workfolder and a conflict is detected, the user whose changes created the conflict (typically the second user to save an updated WorkFolder) is presented with a mediation dialog containing conflict resolution data and prompted to resolve. In this example, two conflicts are present. As shown, the conflict dialog box 170 indicates the data element that changed 172, the change that was made by the present user 174, the conflicting change entered by a previous user 176 and the previous user's ID 178. Given this information, the user can then resolve the conflict on an item-by-item basis by selecting which of the two values to preserve. Alternatively, the user can indicate that all changes introduced by a specified ID be preserved, e.g., by pressing the appropriate function button 180.

FIG. 6 is a screen display which shows conflicting sub-items that result when a conflict requiring mediation occurs but mediation is not immediately performed (i.e., during unattended reconciliation). When a WorkFolder with a conflict element is retrieved and viewed, both versions of the conflicting element are presented as sub-elements 184, 186 under a special conflict heading 182. In this example, a conflict was created when one user defined the status of Invention Disclosure "started" while a second user defined the status as "not started." The conflict is resolved when a user with the proper authority selects which of the two sub-items 184, 186 to preserve.

The invention has been described in detail with particular reference to certain preferred embodiments thereof, but it will be understood that variations and modifications can be effected within the spirit and scope of the invention.

What is claimed is:

1. A method of automatically resolving data conflicts in a shared data environment where a plurality of users can concurrently access at least portions of a master data file comprising the steps of:

creating a local data file which is a copy of at least a portion of said master data file;

detecting an attempted update of said master data file with said local data file;

determining if any changes made to said local data file by a first user are in conflict with changes made to said master data file by a second user;

updating said master data file with non-conflicting changes made to said local data file; and in response to determining that a particular change to said local data file conflicts with a change to said master data file:

(a) notifying at least one user of said particular data conflict;

(b) presenting said user with conflict resolving information related to said particular data conflict;

(c) receiving user input indicating how said particular conflict should be resolved; and (d) resolving said particular data conflict in accordance with said user input.

2. The method of claim 1, wherein said at least one notified user includes at least one of said first and second user.

3. The method of claim 1, wherein said presenting step includes the step of displaying at least a portion of the conflicting data in said local data file and said master data file.

4. The method of claim 3, wherein said at least one notified user includes said first user and said presenting step further includes displaying the identify of said second user.

5. A method of automatically resolving data conflicts in a shared data environment where a plurality of users can concurrently access at least portions of a master data file having one or more data elements and existing in a shared storage area, said method comprising the steps of:

creating a local data file which is a copy of at least one of said one or more data elements of said master data file in a local storage area;

detecting an attempted save of an edited version of said local data file by a first user;

determining for each changed data element in said edited local data file whether updating a corresponding data element in said master data file with said changed data element will conflict with a change made to said corresponding data element in said master data file by a second user;

completing said save by:

(a) updating said corresponding data element in said master data file with said changed data element if no conflict will be created; or (b) initiating an attended conflict reconciliation dialog with at least one of said first and second user if a conflict will be created and, according to the results of said dialog, either updating said corresponding data element in said master data file with said changed data element, or preserving said corresponding data element in said master data file.

6. The method of claim 5, wherein:

the step of determining further includes the step of detecting whether said edited version of said local data file contains a new data element; and and the step of completing further includes the step of adding said new data element to said master data file.

7. The method of claim 5, wherein the step of determining further includes the step of comparing said changed data element to one of said corresponding data elements in said master data file, wherein a conflict does not exist if said changed data element and said compared data element are the same.

8. A method of automatically resolving data conflicts in a shared data environment where a plurality of users can concurrently access at least portions of a master data file having one or more data elements and existing in a shared storage area, said method comprising the steps of:

creating a local data file which is a copy of at least one of said one or more data elements of said master data file in a local storage area;

detecting an attempted update of said master data file by a first user with an edited version of said local data file;

in response to a detected update attempt, processing each data element in said edited local file by:
  (a) determining whether said processed data element is a new data element and, if so, adding said processed data element to said master data file and then proceeding to step (f), otherwise proceeding to step (b);
  (b) determining whether the contents of said processed data element have been changed relative to a corresponding data element in said local data file and, if not, proceeding to step (f), otherwise proceeding to step (c);
  (c) determining whether said processed data element is a multi-value data element, and, if so, merging the contents of said processed multi-value data element into a data element in said master data file corresponding to said processed data element and then proceeding to step (f), otherwise proceeding to step (d);
  (d) comparing the contents of said data element in said local data file corresponding to said processed data element with the contents of said data element in said master data file corresponding to said processed data element and, if said local and master corresponding data elements are the same, applying said processed data element to said corresponding master data file element and then proceeding to step (f), otherwise proceeding to step (e);
  (e) indicating that a conflict exists by initiating an attended conflict reconciliation sequence and, depending on the results of said sequence, either processing a subsequent data element, or applying said processed data element to said corresponding master data file element; and
  (f) repeating steps (a)–(e) for another processed data element until each data element in said edited local file has been processed.

9. The method of claim 8, wherein said attended conflict reconciliation sequence comprises the steps of:
  indicating to at least said first user a designation and at least a portion of the content of said processed data element and said corresponding master data element; and
  requesting that said at least said first user select which one of said indicated values to preserve.

10. A method of automatically resolving data conflicts in a shared data environment comprising the steps of:
  providing a shared data computing environment containing a master data file in a shared storage area, the master data file comprising one or more data elements of particular types and having particular attributes, wherein a plurality of users can concurrently edit at least portions of said master data file via respective instances of a local data file in a local storage area,
  creating a local data file in response to a first user opening said master data file, said local data file including copies of one or more data elements and associated attributes from said master data file;
  detecting an attempted update of said master data file with an edited version of said local data file;
  determining for each particular one of said data elements in said edited local data file, in accordance with one or more predefined rules, whether updating said corresponding master data file element to reflect changes made to said particular edited local data file element will generate a true conflict with a change made to said corresponding master data file element by a second user;
  updating said corresponding master data field element to reflect changes made to said particular edited local data file element when it is determined that said updating will not result in a true conflict; and
  initiating a conflict mediation when it is determined that said step of updating would result in a true conflict, wherein said corresponding master data field element is updated to reflect changes made to said particular edited local data file element if said conflict mediation is resolved in favor of said first user.

11. A method of resolving data conflicts in a shared data environment in which copies of data files are distributed across a plurality of data sites, said method comprising the steps of:
  receiving a replicated data file at a data site, said replicated data file corresponding to a current data file existing on said data site;
  upon the occurrence of a potential conflict condition between said replicated data file and said current data file, resolving said potential conflict by creating a reconciled data file from said received replicated data file and said current data file according to a predefined set of rules;
  replacing said corresponding current data file with said reconciled data file; and
  replicating said reconciled data file across said plurality of data sites.

12. The method of claim 11, further comprising the steps of:
  indicating particular data files to which said method will be applied; and
  disabling conflict handling routines external to said method upon receiving a replicated copy of said particular data files.

13. The method of claim 12, wherein data files are replicated via a messaging system and said step of indicating comprises the step of classifying said particular data files as a unique message class.

14. The method of claim 11, wherein said step of resolving further comprises the steps of:
  identifying a particular conflict-type which is not resolved according to said predefined rules;
  storing those portions of said replicated data file and said current data file which form a data conflict of said particular conflict-type in said reconciled data file as conflicting sub-elements;
  in response to a user accessing said reconciled data file, presenting said user with conflict resolving information related to said data conflict;
  receiving user input indicating how said particular conflict should be resolved;
  resolving said particular data conflict in accordance with said user input.

15. A method of resolving data conflicts in a shared data environment in which copies of data files are distributed across a plurality of data sites, each said data file having a designated home site, said method comprising the steps of:
  receiving a replicated data file at a data site, said replicated data file corresponding to a current data file existing on said data site, said current data file and said replicated data file both having the same designated home site;
  in response to the detection of a potential conflict between said replicated data file and said current data file, indicating said potential conflict condition to each of said data sites;

searching for an indicated potential conflict condition at the home site of said replicated and current data files;

in response to detecting an indicated potential conflict condition, resolving said potential conflict by creating a reconciled data file from said replicated data file and said current data file according to a predefined set of rules; and replicating said reconciled data file across said plurality of data sites to replace said corresponding current data files.

16. The method of claim 15, further comprising the steps of:

designating said current data file as being in-conflict upon the receipt of a potential conflict condition indication; and removing the in-conflict designation of said current data file when a reconciled data file replaces said current data file.

17. The method of claim 16, further comprising the step of providing read-only access to an in-conflict designated data file when said data file is accessed on a data site which is not the designated home site.

18. The method of claim 16, further comprising the step of executing said resolving step when an in-conflict data file is accessed on its designated home site.

19. The method of claim 15, wherein said step of resolving further comprises the steps of:

identifying a particular conflict-type which is not to be resolved according to said predefined rules;

storing those portions of said replicated data file and said current data file which form a data conflict of said particular conflict-type in said reconciled data file as conflicting sub-elements;

in response to a user accessing said reconciled data file, presenting said user with conflict resolving information related to said data conflict;

receiving input indicating how said particular conflict should be resolved; and resolving said particular data conflict in accordance with said user input.

20. The method of claim 15, wherein said step of searching is performed on a periodic basis.

21. In a shared data environment where a plurality of users can concurrently access at least portions of a master data file, a system for automatically resolving data conflicts comprising:

means for creating a local data file which is a copy of at least a portion of said master data file;

means for detecting an attempted update of said master data file with said local data file;

means for determining if any changes made to said local data file by a first user are in conflict with changes made to said master data file subsequent to said creating step by a second user;

means for updating said master data file with non-conflicting changes made to said local data file;

means for notifying at least one user of said particular data conflict;

means for presenting said user with conflict resolving information related to said particular data conflict;

means for receiving user input indicating how said particular conflict should be resolved; and means for resolving said particular data conflict in accordance with said user input.

22. The system of claim 21, wherein said at least one notified user includes at least one of said first and second user.

23. The system of claim 21, wherein said means for presenting includes a means for displaying at least a portion of the conflicting data in said local data file and said master data file.

24. The system of claim 23, wherein said at least one notified user includes said first user and said means for presenting further includes means for displaying the identify of said second user.

25. In a shared data environment where a plurality of users can concurrently access at least portions of a master data file having one or more data elements and existing in a shared storage area, a system for automatically resolving data conflicts comprising:

means for creating a local data file which is a copy of at least one of said one or more data elements of said master data file in a local storage area;

means for detecting an attempted save of an edited version of said local data file by a first user;

means for determining for each changed data element in said edited local data file whether updating a corresponding data element in said master data file with said changed data element will conflict with a change made to said corresponding data element in said master data file by a second user;

means for completing said save by either (a) updating said corresponding data element in said master data file with said changed data element if no conflict will be created or (b) initiating an attended conflict reconciliation dialog with at least one of said first and second user if a conflict will be created and, according to the results of said dialog, either updating said corresponding data element in said master data file with said changed data element, or preserving said corresponding data element in said master data file.

26. The system of claim 25, wherein:

said means for determining further comprises means for detecting whether said edited version of said local data file contains a new data element; and said means for completing further comrpses means for adding said new data element to said master data file.

27. The system of claim 25, wherein the means for determining further includes means for comparing said changed data element to one of said corresponding data elements in said master data file, wherein a conflict does not exist if said changed data element and said compared data element are the same.

28. In a shared data environment containing a master data file in a shared storage area, the master data file comprising one or more data elements of particular types and having particular attributes, wherein a plurality of users can concurrently edit at least portions of said master data file via respective instances of a local data file, a system for automatically resolving data conflicts in a shared data environment comprising:

means for creating a local data file in response to a first user opening said master data file, said local data file including copies of one or more data elements and associated attributes from said master data file;

means for detecting an attempted update of said master data file with an edited version of said local data file;

means for determining for each particular one of said data elements in said edited local data file in accordance with one or more predefined rules whether updating said corresponding master data file element to reflect changes made to said particular edited local data file element will generate a true conflict with a change made to said corresponding master data file element by a second user subsequent to said creating step;

means for updating said corresponding master data field element to reflect changes made to said particular edited local data file element when it is determined that said updating will not result in a true conflict; and means for initiating a conflict mediation dialog when it is determined that said updating will result in a true conflict, wherein said corresponding master data field element is updated to reflect changes made to said particular edited local data file element if said conflict mediation is resolved in favor of said first user.

29. In a shared data environment in which copies of data files are distributed across a plurality of data sites, a system for resolving data conflicts comprising:

means for receiving a replicated data file at a data site, said replicated data file corresponding to a current data file existing on said data site;

means responsive to the occurrence of a potential conflict condition between said replicated data file and said current data file for resolving said potential conflict by creating a reconciled data file from said replicated data file and said current data file according to a predefined set of rules; and means for replicating said reconciled data file across said plurality of data sites to replace said corresponding current data files.

30. The system of claim 29, further comprising:

means for indicating particular data files to which said method will be applied; and means for disabling conflict handling routines external to said method upon receiving a replicated copy of said particular data files.

31. The system of claim 30, wherein data files are replicated via a messaging system and means for indicating comprises means for classifying said particular data files as a unique message class.

32. The system of claim 29, wherein said means for resolving further comprises:

means for identifying a particular conflict-type which is not to be resolved according to said predefined rules;

means for storing those portions of said replicated data file and said current data file which form a data conflict of said particular conflict-type in said reconciled data file as conflicting sub-elements;

means responsive to a user accessing said reconciled data file, for presenting said user with conflict resolving information related to said data conflict;

means for resolving said particular data conflict in response to user input.

33. In a shared data environment in which copies of data files are distributed across a plurality of data sites, each said data file having a designated home site, a system for resolving data conflicts comprising:

means for receiving a replicated data file at a data site, said replicated data file corresponding to a current data file existing on said data site, said current data file and said replicated data file both having the same designated home site;

means responsive to the detection of a potential conflict between said replicated data file and said current data file for indicating said potential conflict condition to each of said data sites;

means for searching for an indicated potential conflict condition at the home site of said replicated and current data files;

means responsive to the detection of an indicated potential conflict condition for resolving said potential conflict by creating a reconciled data file from said replicated data file and said current data file according to a predefined set of rules; and means for replicating said reconciled data file across said plurality of data sites to replace said corresponding current data files.

34. The system of claim 33, further comprising:

means responsive to the receipt of a potential conflict condition indication for designating said current data file as being in-conflict; and means responsive to the replacement of said current data file with a reconciled data file for removing the in-conflict designation of said current data file.

35. The system of claim 34, further comprising means for providing read-only access to an in-conflict designated data file when said data file is accessed on a data site which is not the designated home site for said data file.

36. The system of claim 34, wherein said means for resolving is responsive to a user accessing an in-conflict data file on its designated home site.

37. The system of claim 33, wherein said means for resolving further comprises:

means for identifying a particular conflict-type which is not to be resolved according to said predefined rules;

means for storing those portions of said replicated data file and said current data file which form a data conflict of said particular conflict-type in said reconciled data file as conflicting sub-elements;

means responsive to a user accessing said reconciled data file for presenting said user with conflict resolving information related to said conflicting sub-elements;

means for receiving user input indicating which of said presented conflicting sub-elements should be preserved; and means for resolving said particular data conflict in accordance with said user input.

* * * * *